US008563189B2

(12) United States Patent
Maeshima et al.

(10) Patent No.: US 8,563,189 B2
(45) Date of Patent: Oct. 22, 2013

(54) FUEL CELL SYSTEM

(75) Inventors: Susumu Maeshima, Yokosuka (JP); Yuki Ogawa, Yokosuka (JP); Takashi Aoyama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 941 days.

(21) Appl. No.: 12/304,652

(22) PCT Filed: Aug. 9, 2007

(86) PCT No.: PCT/IB2007/002311
§ 371 (c)(1),
(2), (4) Date: Dec. 12, 2008

(87) PCT Pub. No.: WO2008/017946
PCT Pub. Date: Feb. 14, 2008

(65) Prior Publication Data
US 2009/0191437 A1   Jul. 30, 2009

(30) Foreign Application Priority Data
Aug. 10, 2006   (JP) .................................. 2006-218151

(51) Int. Cl.
H01M 8/04   (2006.01)
(52) U.S. Cl.
USPC .......................................... 429/432; 429/434
(58) Field of Classification Search
USPC ................................ 429/432, 434
See application file for complete search history.

(56) References Cited

U.S. PATENT DOCUMENTS

| 2002/0039674 A1 | 4/2002 | Suzuki et al. |
| 2002/0192520 A1 | 12/2002 | Nonobe |
| 2004/0033399 A1 | 2/2004 | Imamura et al. |

FOREIGN PATENT DOCUMENTS

| JP | 2002-164065 | 6/2002 |
| JP | 2002-184438 | 6/2002 |
| WO | WO 2006/069070 | 6/2006 |

Primary Examiner — Ula C Ruddock
Assistant Examiner — Frank Chernow
(74) Attorney, Agent, or Firm — Drinker Biddle & Reath LLP

(57) ABSTRACT

A fuel cell system including a plurality of single-cell units, each of which include an electrolyte membrane disposed between an anode and a cathode and which generate electric power by a reaction of a fuel gas in the anode and an oxidizer gas in the cathode, and a fuel cell in-which the plurality of single-cell units are stacked. A plurality of voltage measurement devices measure the voltages of the single-cell units, respectively. A control unit determines the humidification state of the fuel cell based on the voltage of a second single-cell unit wherein when the voltage of the second single-cell is equal to or lower than an insufficient-humidification-determining voltage which is higher than the predetermined voltage the control unit determines that humidification of the fuel cell is insufficient, disposed in the vicinity of a first single-cell unit, the first single-cell unit having a voltage that is equal to or lower than a predetermined voltage.

20 Claims, 13 Drawing Sheets

FUEL CELL SYSTEM

CROSS-REFERENCE TO RELATED APPLICATIONS

This application claims priority to Japanese Patent Application No. 2006-218151, filed Aug. 10, 2006, the disclosure of which is incorporated by reference herein in its entirety.

BACKGROUND OF THE INVENTION

1. Field of the Invention

The present invention relates generally to a fuel cell system, and more particularly to a fuel cell system including a fuel cell formed of a plurality of stacked single cells, each having an anode, a cathode, and an electrolyte membrane disposed between the anode and the cathode.

2. Description of the Related Art

A known fuel cell system, disclosed, for example, in Japanese Unexamined Patent Application Publication No. 2002-184438, measures the voltages of single cells forming a fuel cell and determines whether or not each of the voltages is a predetermined value or lower. The fuel cell system then determines the stacked position of a single cell whose voltage is equal to or lower than the predetermined value. Furthermore, when the stacked position of the above single cell is in the vicinity of either end of a stack, the fuel cell system determines the state of humidification of the stack to be that of excessive humidification. In contrast, when the stacked position of the above single cell is in the vicinity of the center of the stack, the fuel cell system determines the state of humidification of the stack to be that of insufficient humidification.

SUMMARY OF THE INVENTION

However, in practice, in the known fuel cell system, when the stacked position of a single cell is in the vicinity of the center of the stack, the voltage of the single cell may be decreased because of excessive humidification. Similarly, when the stacked position of a single cell is in the vicinity of either end of the stack, the voltage of the single cell may be decreased because of insufficient humidification. Accordingly, the known fuel cell system cannot accurately determine the humidification state of the fuel cell.

In an embodiment, the invention provides a fuel cell system including a plurality of single-cell units, each of which include an electrolyte membrane disposed between an anode and a cathode and which generate electric power by a reaction of a fuel gas in the anode and an oxidizer gas in the cathode, and a fuel cell in which the plurality of single-cell units are stacked. A plurality of voltage measurement devices measure the voltages of the single-cell units, respectively. A control unit determines the humidification state of the fuel cell based on the voltage of a second single-cell unit disposed in the vicinity of a first single-cell unit, the first single-cell unit having a voltage that is equal to or lower than a predetermined voltage.

In another embodiment, the invention provides a fuel cell system, including a plurality of single-cell units, each of which include an electrolyte membrane disposed between an anode and a cathode and which generate electric power by a reaction of a fuel gas in the anode and an oxidizer gas in the cathode, and a fuel cell in which the plurality of single-cell units are stacked. A plurality of voltage measurement devices measure the voltages of the single-cell units, respectively. A control unit determines that humidification of the fuel cell is excessive when the control unit detects a first single-cell unit having a voltage that is equal to or lower than a predetermined voltage, and a second single-cell unit having a voltage that is equal to or higher than an excessive-humidification-determining voltage that is higher than the predetermined voltage.

According to the present invention, the humidification state of a fuel cell can be accurately determined.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

Figure 1:
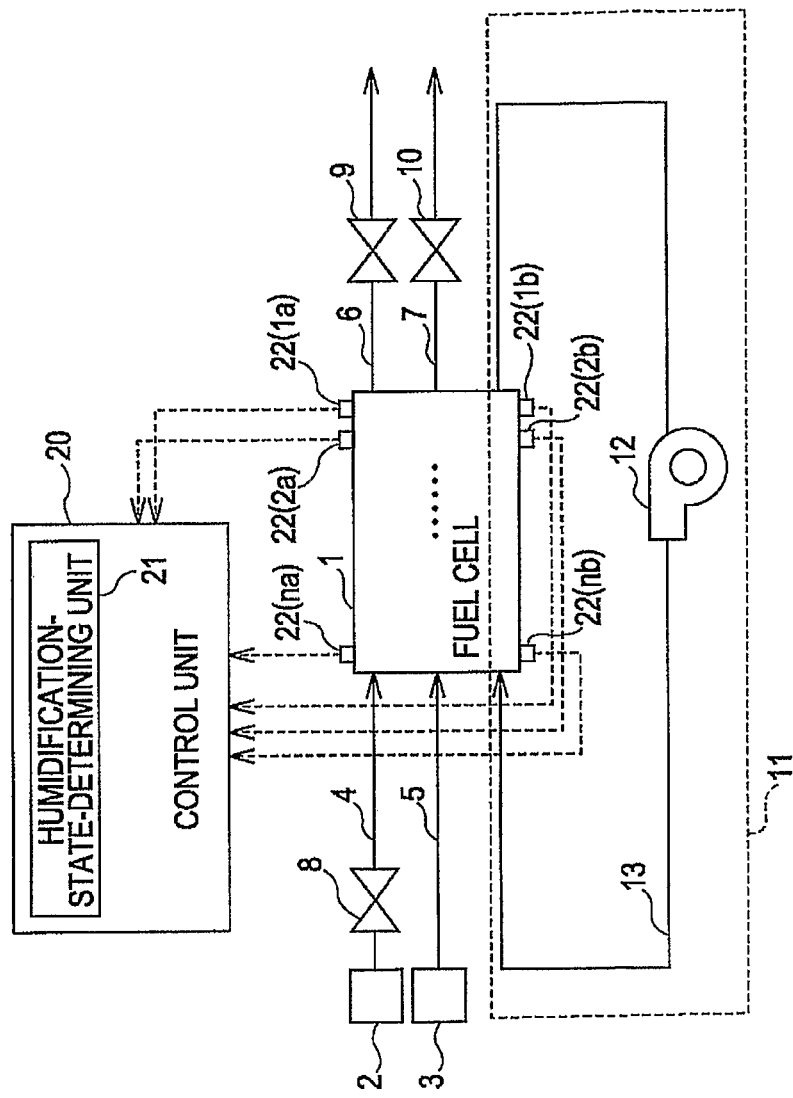
FIG. 1 is a schematic block diagram showing a fuel cell system including a humidification-state-determining device of a fuel cell according to a first embodiment of the invention.

Embodiments of the present invention will now be described with reference to the drawings. In the drawings, common or similar parts are assigned the same or similar reference numerals.

First Embodiment

A humidification-state-determining device of a fuel cell according to a first embodiment of the present invention will now be described with reference to FIG. 1. FIG. 1 shows the overall structure of a fuel cell system including the humidification-state-determining device of the fuel cell according to the first embodiment. The fuel cell system of the first embodiment includes a fuel cell 1 that generates electric power by a reaction of a fuel gas containing hydrogen and an oxidizer gas containing oxygen, a fuel gas supply device 2 that supplies the fuel gas, an oxidizer gas supply device 3 that supplies the oxidizer gas (e.g., air), a cooling-water circulation unit 11 that circulates cooling water, voltage measurement devices (e.g. voltage sensors) 22, and a control unit 20 that controls the operation of each component constituting the fuel cell system to control the power generation of the fuel cell 1.

The fuel gas supply device 2 may be, for example, a storage tank that stores a fuel gas containing hydrogen under high pressure. The oxidizer gas supply device 3 may be, for example, a compressor that supplies air.

The fuel gas inlet of the fuel cell 1 is connected to the fuel gas supply device 2 via a fuel gas supply line 4. The oxidizer gas inlet of the fuel cell 1 is connected to the oxidizer gas supply device 3 via an oxidizer gas supply line 5. An anode exhaust gas is discharged from a fuel gas discharge line 6 connected to the fuel gas outlet of the fuel cell 1. A cathode exhaust gas is discharged from an oxidizer gas discharge line 7 connected to the oxidizer gas outlet of the fuel cell 1.

A fuel-gas-pressure control valve 8 is provided in the fuel gas supply line 4 to control the pressure of the fuel gas supplied to the fuel cell 1. A purge valve 9 is provided in the fuel gas discharge line 6, and is usually closed. When the fuel cell 1 generates a predetermined amount of electric power or generates power for a predetermined time, the purge valve 9 opens and moisture and nitrogen gas are discharged together with the fuel gas. An oxidizer-gas-pressure control valve 10 is provided in the oxidizer gas discharge line 7 to control the pressure of the oxidizer gas.

The cooling-water circulation unit 11 includes a cooling-water supply line 13 connected to the inlet and the outlet of the cooling water of the fuel cell 1, and a circulation pump 12 that is provided in the cooling-water supply line 13 and circulates the cooling water.

The control unit 20 includes a humidification-state-determining unit 21 that determines the humidification state of the fuel cell 1.

Figure 2:
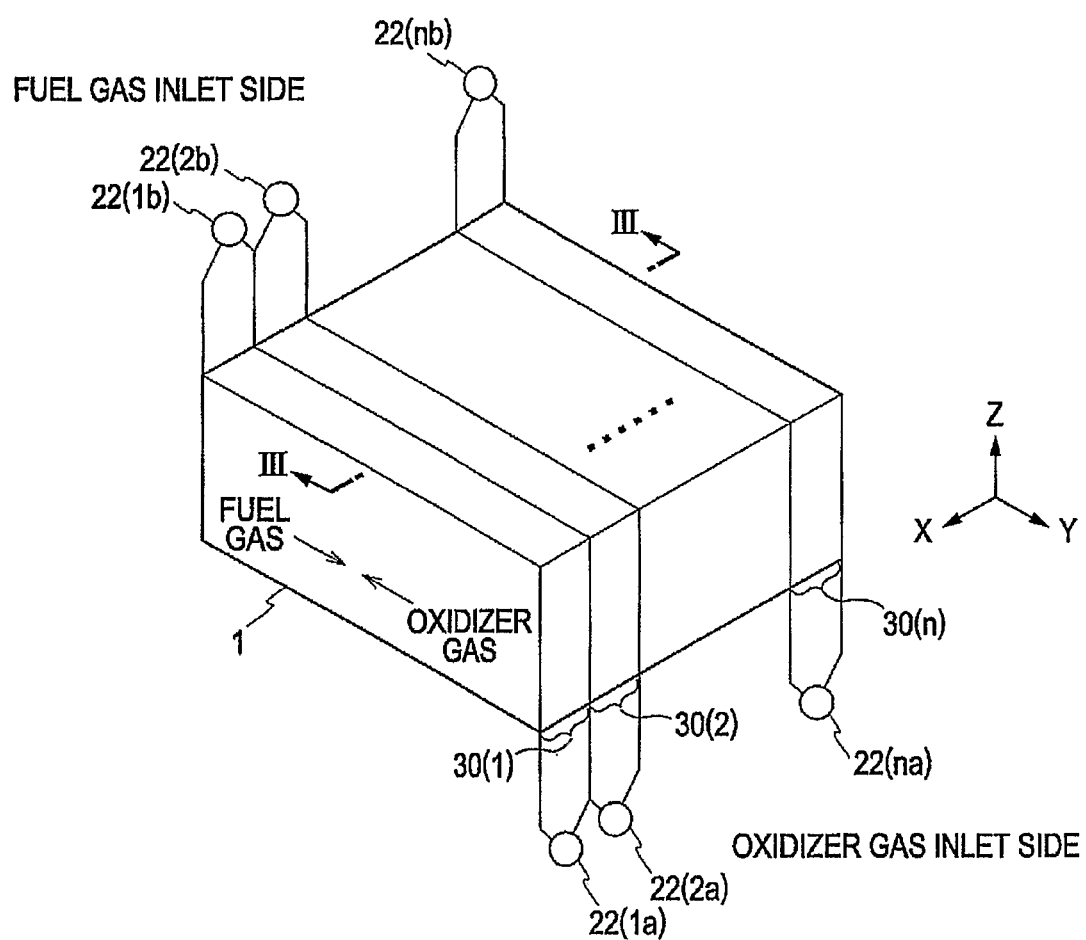
FIG. 2 shows the arrangement of voltage sensors for measuring the voltages of single-cell units forming the fuel cell shown in FIG. 1.

As shown in FIG. 2, the fuel cell 1 has a structure in which a plurality of single-cell units 30 each composed of a single cell are stacked. More specifically, in the fuel cell 1, the single-cell units 30(1) to 30(n) forming the fuel cell 1, respectively include voltage sensors 22(1a) to 22(na) that detect the voltages V(1a) to V(na) at an end "a" of each of the single-cell units 30, and voltage sensors 22(1b) to 22(nb) that detect the voltages V(1b) to V(nb) at an end "b" of each of the single-cell units 30, where, n corresponds to the number of stacked single-cell units 30. In this embodiment, for example, n=100.

The voltage sensors 22 are preferably disposed at positions where it is highly possible that excessive humidification or insufficient humidification of each of the single-cell units 30 occurs. The measurement positions are preferably located at the outlets of the oxidizer gas or the fuel gas, for the following reason. For example, at the oxidizer gas side, the humidity increases from the inlet to the outlet because of the production of water caused by power generation. Accordingly, it is highly possible that excessive humidification occurs at the outlet side. At the fuel gas side, the relative humidity increases from the inlet to the outlet because of the consumption of the fuel gas. In addition, water is diffused from the oxidizer gas side to the fuel gas side. Accordingly, it is highly possible that excessive humidification occurs at the outlet side.

Accordingly, as shown in FIG. 2, when the fuel gas and the oxidizer gas are supplied in opposite flow directions, the voltage sensors 22 are provided both at the outlet of the fuel gas (the inlet of the oxidizer gas) and at the outlet of the oxidizer gas (the inlet of the fuel gas), thereby determining whether humidification is excessive at the oxidizer gas side or humidification is excessive at the fuel gas side.

Figure 3:
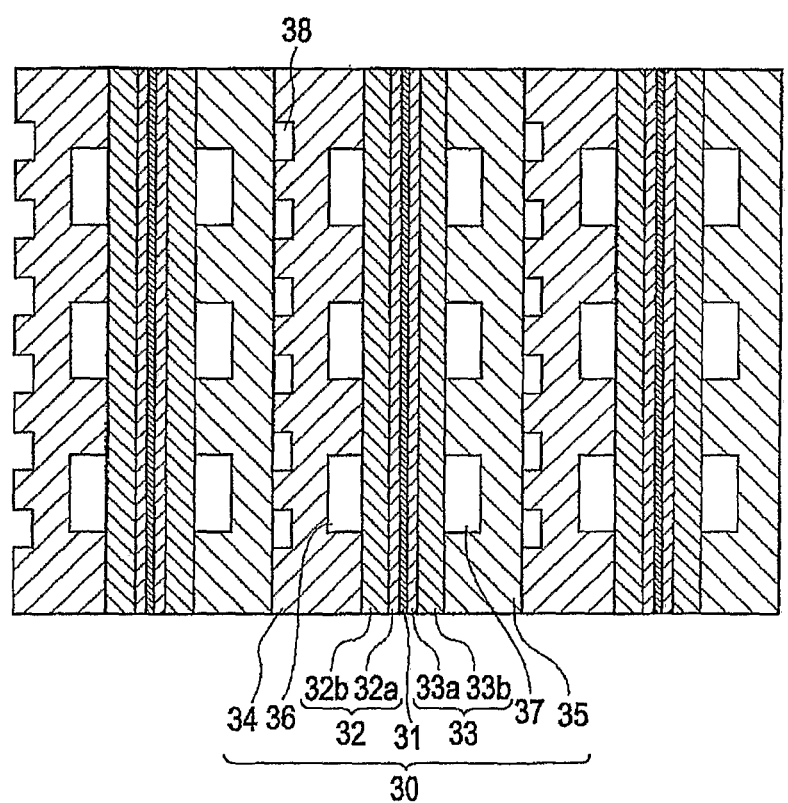
FIG. 3 is a cross-sectional view showing the structure of a single-cell unit of the fuel cell shown in FIG. 1.

FIG. 3 is a cross-sectional view taken along line III-III of the fuel cell 1 shown in FIG. 2. Each of the single-cell units 30 includes a solid electrolyte membrane 31 having proton conductivity, an oxidizer electrode layer (i.e. cathode) 32, a fuel electrode layer (i.e. anode) 33, an oxidizer gas separator 34, and a fuel gas separator 35. The solid electrolyte membrane 31 is disposed between the cathode 32 and the anode 33. The oxidizer gas separator 34 is disposed to face the cathode 32 at the side opposite the solid electrolyte membrane 31. The fuel gas separator 35 is disposed to face the anode 33 at the side opposite the solid electrolyte membrane 31.

The cathode 32 includes an oxidizer gas diffusion layer 32a and a cathode catalyst layer 32b. The anode 33 includes a fuel gas diffusion layer 33a and an anode catalyst layer 33b. Each of the oxidizer gas diffusion layer 32a and the fuel gas diffusion layer 33a is composed of a porous material such as carbon fiber. Each of the cathode catalyst layer 32b and the anode catalyst layer 33b is composed of a carbon carrier carrying platinum as a catalyst.

The oxidizer gas separator 34 includes an oxidizer gas flow path 36 adjacent to the cathode 32. The fuel gas separator 35 includes a fuel gas flow path 37 adjacent to the anode 33. A cooling-water flow path 38 is provided between the cathode 32 and the anode 33 which are adjacent to each other.

Figure 4:
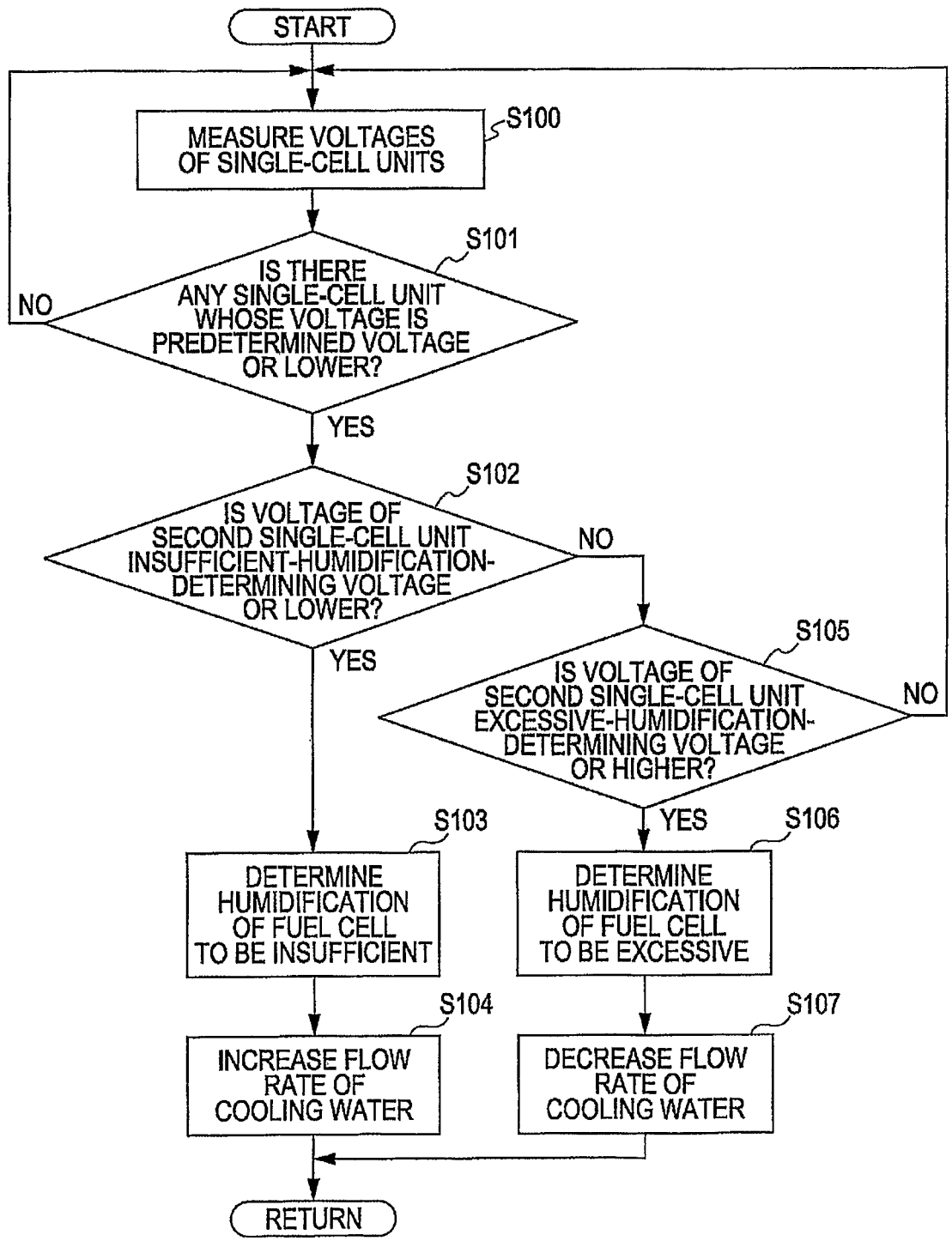
FIG. 4 is a flowchart showing the operation of the humidification-state-determining device of the fuel cell shown in FIG. 1.

The operation of the humidification-state-determining device of the fuel cell according to the first embodiment will now be described with reference to the flowchart shown in FIG. 4.

First, in step S100, the voltages V(1a) to V(na) and V(1b) to V(nb) of the single-cell units 30(1) to 30(n) are measured. In step S101, it is detected whether or not, among the voltages V(1a) to V(na) and V(1b) to V(nb) of the single-cell units 30 measured in step S100, there is any single-cell unit 30 whose voltage is a predetermined voltage or lower. When, among the single-cell units 30, a first single-cell unit whose voltage is the predetermined voltage or lower is present ("YES" in step S101), the program proceeds to step S102. When, among the single-cell units 30, a single-cell unit 30 whose voltage is the predetermined voltage or lower is not present ("NO" in step S101), the program returns to step S100, and the operation is continued. The "predetermined voltage" is a value lower than the average cell voltage and is set by experimentally determining the voltage of a single-cell unit 30 which is in an insufficient humidification (i.e. dry-out) state or an excessive humidification (i.e. flooding) state.

In step S102, the voltage a second single-cell unit, disposed in the vicinity of the first single-cell unit whose voltage is the predetermined voltage or lower, is compared with an insufficient-humidification-determining voltage. When the voltage of the second single-cell unit is equal to or lower than the insufficient-humidification-determining voltage ("YES" in step S102), the humidification-state-determining unit 21 determines that humidification of the fuel cell 1 is insufficient (step S103). The program proceeds to step S104, and the control unit 20 increases the flow rate of the cooling water. On the other hand, when the voltage of the second single-cell unit is higher than the insufficient-humidification-determining voltage ("NO" in step S102), the program proceeds to step S105. The meaning of the term "vicinity" includes not only a single-cell unit adjacent to the first single-cell unit but also single-cell units that are separated from the first single-cell unit by a plurality of single-cell units. That is, the second single-cell unit disposed in the vicinity of the first single-cell unit may be separated from the first single-cell unit by a plurality of single-cell units. However, all of the plurality of single-cell units need not satisfy the above condition (in step S102). It is sufficient that at least one of the single-cell units satisfies the condition. Furthermore, the second single-cell unit may be adjacent to the first single-cell unit and have a voltage higher than the predetermined voltage.

In step S105, the voltage of the second single-cell unit is compared with an excessive-humidification-determining voltage. When the voltage of the second single-cell unit is equal to or higher than the excessive-humidification-determining voltage ("YES" in step S105), the humidification-state-determining unit 21 determines that humidification of the fuel cell 1 is excessive (step S106). The program proceeds to step S107, and the control unit 20 decreases the flow rate of the cooling water. On the other hand, when the voltage of the second single-cell unit is lower than the excessive-humidification-determining voltage ("NO" in step S105), the program returns to step S100 and the operation is continued.

In step S103, when the voltage of the second single-cell unit is equal to or lower than the insufficient-humidification-determining voltage, the humidification-state-determining unit 21 determines that humidification of the fuel cell 1 is insufficient. The reason for this will now be described.

When humidification of a single-cell unit 30 is insufficient, the solid electrolyte membrane becomes dry, thereby increasing the resistance of the solid electrolyte membrane. When the electromotive force of a single-cell unit 30 is represented by E, the current is represented by I, and the resistance of a single-cell unit 30 is represented by R, the voltage V of a single-cell unit 30 is represented by:

$$V = E - I \times R \quad \text{Equation (1)}$$

Accordingly, in a single-cell unit 30 which is in an insufficient humidification state, an increase in the resistance R decreases the voltage. Furthermore, heat due to the increase in the resistance R is dissipated. Therefore, the voltage is decreased because of insufficient humidification, and the temperature is increased in the vicinity of the first single-cell unit. Accordingly, the second single-cell unit also becomes dry. Consequently, humidification also becomes insufficient in the vicinity of the first single-cell unit, resulting in a decrease in the voltage of the second single-cell unit.

When the voltage of the second single-cell unit is equal to or higher than the excessive-humidification-determining voltage, the humidification-state-determining unit 21 determines that humidification of the fuel cell 1 is excessive. The reason for this will now be described.

Figure 5:
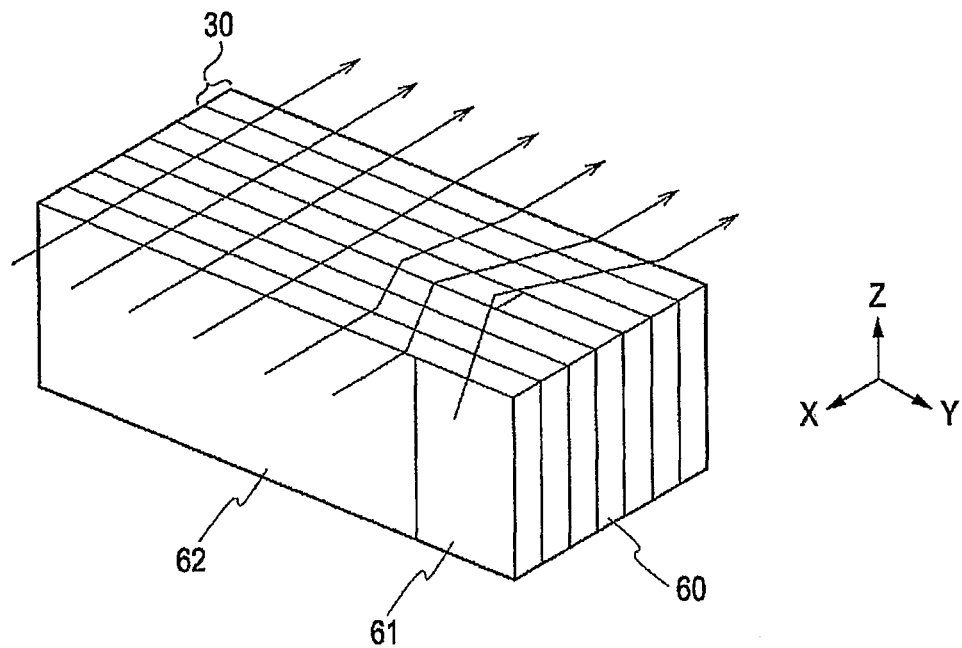
FIG. 5 is a diagram showing the density distribution of the current flowing in a fuel cell when the fuel cell is in an excessive humidification state.
Figure 6:
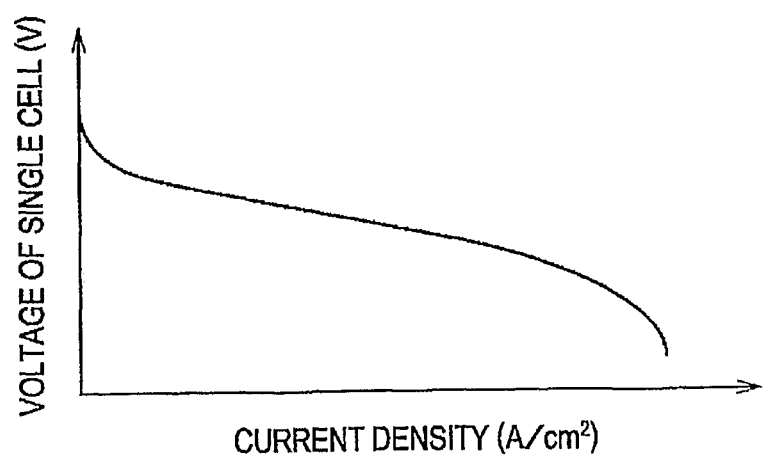
FIG. 6 is a graph showing the relationship between the current density of the current flowing in a fuel cell and the voltage of the fuel cell.

When humidification of a single-cell unit 30 is excessive, a supply gas flow path becomes clogged by condensed water. Accordingly, since the reaction between the fuel gas and the oxidizer gas is inhibited, power generation does not occur, resulting in a decrease in the voltage. However, in order that the current flows at a constant value regardless of the portions where the power is not generated, the current must flow while bypassing the portions where the power is not generated. Consequently, a density distribution of current is generated. FIG. 5 is a diagram of the current density distribution. The arrows in the figure indicate the flow of current. For example, even in the case where the current density is 1 (A/cm$^2$) in a single-cell unit 30, when a portion 60 where the power is not generated because excessive humidification is formed, the current density at a portion 61 is 0.6 (A/cm$^2$) and the current density at a portion 62 is 1.1 (A/cm$^2$). Thus, a distribution is generated in the current density. The relationship between the current density and the voltage of a single-cell unit 30 is shown by the performance curve in FIG. 6. As shown in FIG. 6, when the current density is decreased, the voltage is increased.

Accordingly, when the portion 60 where the power is not generated because excessive humidification is present in the first single-cell unit, in the second single-cell unit, the current density at the portion 61 is decreased, resulting in an increase in the voltage.

Figure 7:
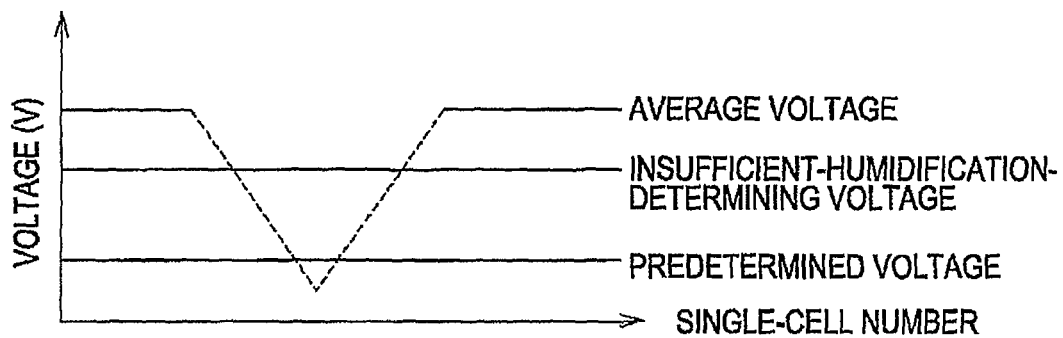
FIG. 7 is a graph showing the relationship between an insufficient-humidification-determining voltage and the average voltage according to the first embodiment.
Figure 8:
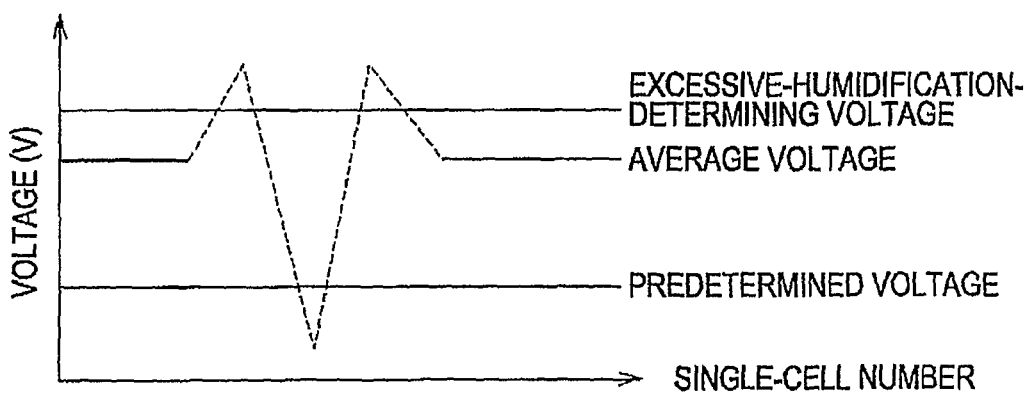
FIG. 8 is a graph showing the relationship between an excessive-humidification-determining voltage and the average voltage according to the first embodiment.

In this embodiment, the insufficient-humidification-determining voltage and the excessive-humidification-determining voltage are determined as follows. In fuel cells, the voltages are varied because of a variation in a gas flow distribution or the like. Therefore, even when a fuel cell is normally operated, a single-cell unit whose voltage is lower than the average voltage or a single-cell unit whose voltage is higher than the average voltage is present. Accordingly, as shown in FIG. 7, the insufficient-humidification-determining voltage is lower than the average voltage and is set by experimentally determining the voltage of a single-cell unit adjacent to a single-cell unit which is in an insufficient humidification state. As shown in FIG. 8, the excessive-humidification-determining voltage is higher than the average voltage and is set by experimentally determining the voltage of a single-cell unit adjacent to a single-cell unit which is in an excessive humidification state.

As described above, in the first embodiment, the humidification state of the fuel cell can be determined by measuring the voltage of the second single-cell unit. Accordingly, the humidification state can be instantaneously determined.

In addition, a predetermined value for determining insufficient humidification of the fuel cell 1 and a predetermined value for determining excessive humidification thereof are set as different values. Consequently, even when the voltage is varied, the humidification state can be accurately determined.

Furthermore, the single-cell units 30 are each composed of a single cell and the voltages of all the single cells are measured. Accordingly, the accuracy of the measurement of the voltage is satisfactory, and the humidification state can be accurately determined.

After it is determined that the humidification of the fuel cell 1 is insufficient in step S103, the flow rate of the cooling water is increased in step S104. Accordingly, heat generated by the power generation of the fuel cell is absorbed by the cooling water, and the temperature in the fuel cell is decreased, thereby increasing the humidity. Thus, the fuel cell 1 can be in an appropriate operating state. Similarly, after it is determined that the humidification of the fuel cell 1 is excessive in step S106, the flow rate of the cooling water is decreased in step S107. Thus, the fuel cell 1 can be in an appropriate operating state.

Modification of First Embodiment

Figure 9:
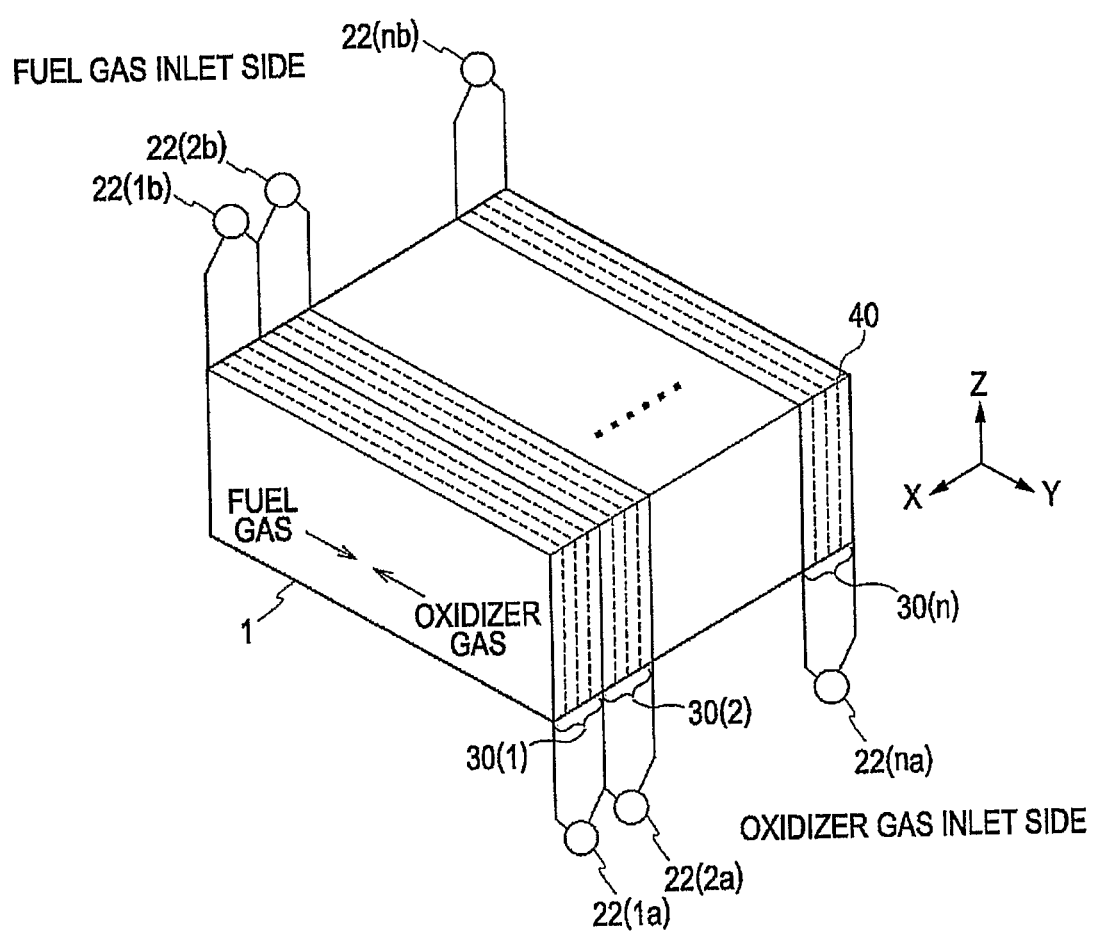
FIG. 9 shows the arrangement of voltage sensors for measuring the voltages of single-cell units according to a modification of the first embodiment.

In the first embodiment, the single-cell units 30 are each composed of a single cell, and the voltage is measured in each single cell. Alternatively, as shown in FIG. 9, each of the single-cell units 30 may be composed of a plurality of single cells 40. Accordingly, the structure of the humidification-state-determining device of the fuel cell can be simplified.

In the first embodiment, when it is determined that the humidification of the fuel cell 1 is insufficient, (1) the flow rate of the cooling water is increased. Alternatively, (2) the flow rate of at least one of the fuel gas and the oxidizer gas may be decreased, (3) the pressure of at least one of the fuel gas and the oxidizer gas may be increased, or (4) the humidity of at least one of the fuel gas and the oxidizer gas may be increased. Alternatively, the operations of (1), (2), (3), and (4) may be performed in combination.

The above operations provide the following advantages. When the flow rate of at least one of the fuel gas and the oxidizer gas is decreased, the amount of moisture removed from the single-cell units 30 is decreased, and thus the humidification state can become a wet state. When the pressure of at least one of the fuel gas and the oxidizer gas is increased, in the gas having an increased pressure, the amount of moisture that can be introduced inside the stack can be increased, and thus the humidification state can become a wet state. Furthermore, when the humidity of at least one of the fuel gas and the oxidizer gas is increased, water vapor is easily condensed, and thus the humidification state can become a wet state. Accordingly, the fuel cell can be in an appropriate operating state.

In the first embodiment, when it is determined that the humidification of the fuel cell 1 is excessive, (1) the flow rate of the cooling water is decreased. Alternatively, (2) the flow rate of at least one of the fuel gas and the oxidizer gas may be increased, (3) the pressure of at least one of the fuel gas and the oxidizer gas may be decreased, or (4) the humidity of at least one of the fuel gas and the oxidizer gas may be decreased. Alternatively, the operations of (1), (2), (3), and (4) may be performed in combination. The advantages of these operations are opposite to those in the case of insufficient humidification. Therefore, a description thereof is omitted.

In the first embodiment, the insufficient-humidification-determining voltage and the excessive-humidification-determining voltage are different values. Alternatively, these values may be the same. For example, when the humidification is insufficient, the voltage of the second single-cell unit is lower than the average voltage. When the humidification is excessive, the voltage of the second single-cell unit is higher than the average voltage. Accordingly, the insufficient-humidification-determining voltage and the excessive-humidification-determining voltage may be the average voltage of the single-cell units 30 constituting the fuel cell 1 and may be the same value. Since the average voltage can be easily calculated, the structure of the humidification-state-determining device of the fuel cell can be simplified.

Second Embodiment

In the first embodiment, in determination of the insufficient humidification (step S102 in FIG. 4), the voltage of the second single-cell unit is only compared with the insufficient-humidification-determining voltage. However, in a second embodiment, a change in the voltage of the second single-cell unit over time is measured to determine whether the humidification is insufficient or not.

The structure of the humidification-state-determining device of a fuel cell of the second embodiment is the same as that shown in FIG. 1. Therefore, a description of the structure is not repeated.

Figure 10:
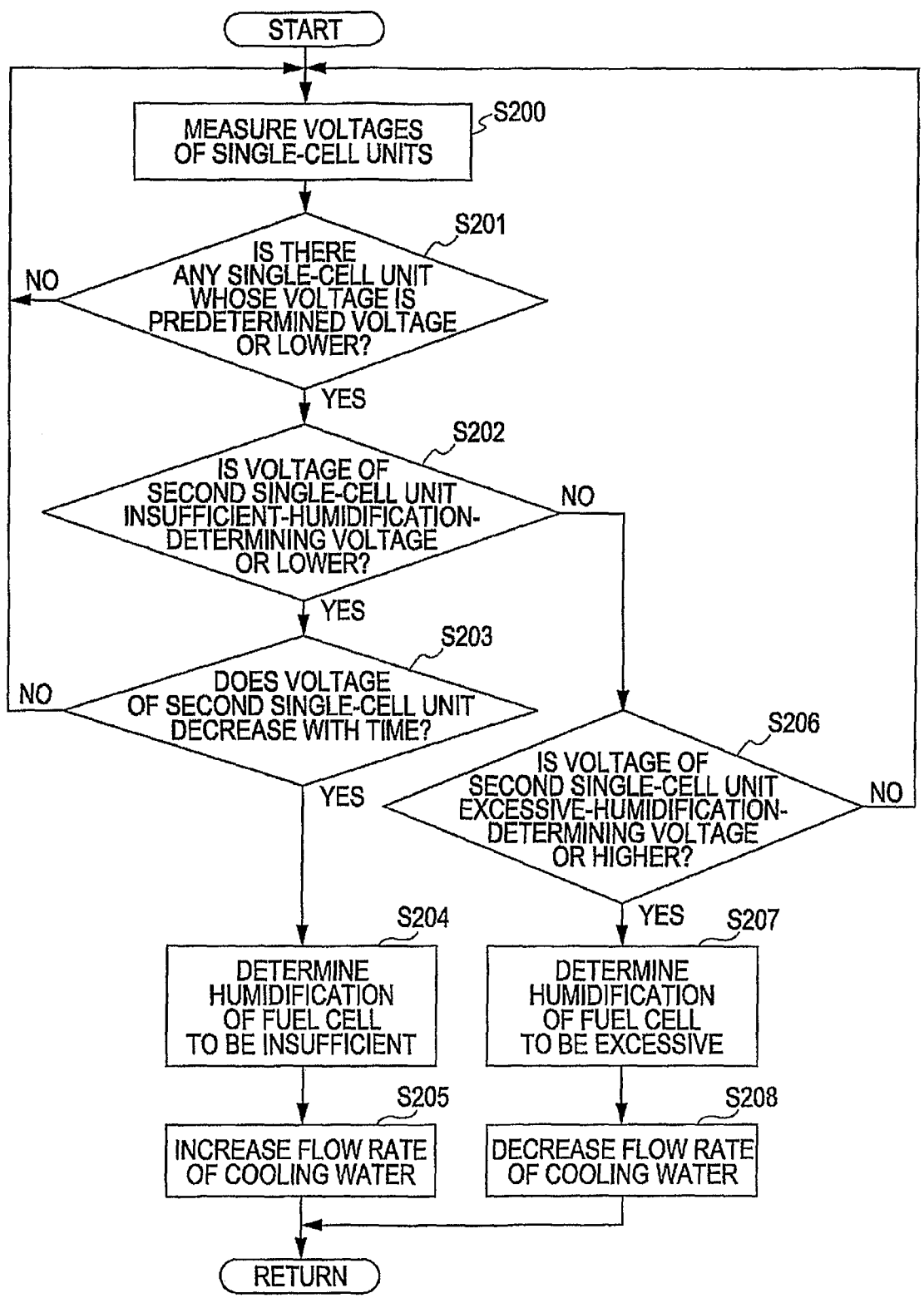
FIG. 10 is a flowchart showing the operation of a humidification-state-determining device of a fuel cell according to a second embodiment of the invention.

The operation of the humidification-state-determining device of the fuel cell according to the second embodiment will now be described with reference to the flowchart shown in FIG. 10. Steps S200 to S202 are the same as steps S100 to S102 shown in FIG. 4. In step S203, it is determined whether or not the voltage of the second single-cell unit decreases with time. When the voltage of the second single-cell unit decreases with time ("YES" in step S203), the program proceeds to step S204, and the humidification-state-determining unit 21 determines that humidification of the fuel cell 1 is insufficient. When the voltage of the second single-cell unit does not decrease with time ("NO" in step S203), the program returns to step S200 and the operation is continued. Steps S205 to S208 are the same as steps S104 to S107 shown in FIG. 4. Therefore, a description of these steps is not repeated.

When humidification of a single-cell unit 30 is insufficient and the operation is continued, drying proceeds, and therefore, the voltage continues to decrease. Accordingly, in the second embodiment, by measuring the change in the voltage over time, the state of insufficient humidification can be determined with higher accuracy.

Third Embodiment

In the first embodiment, in determination of the excessive humidification (step S105 in FIG. 4), the voltage of the second single-cell unit is compared with the excessive-humidification-determining voltage only once. However, in a third embodiment, when the voltage of second single-cell unit exceeds the excessive-humidification-determining voltage twice or more, it is determined that humidification of the fuel cell is excessive.

The structure of the humidification-state-determining device of a fuel cell of the third embodiment is the same as that shown in FIG. 1. Therefore, a description of the structure is not repeated.

Figure 11:
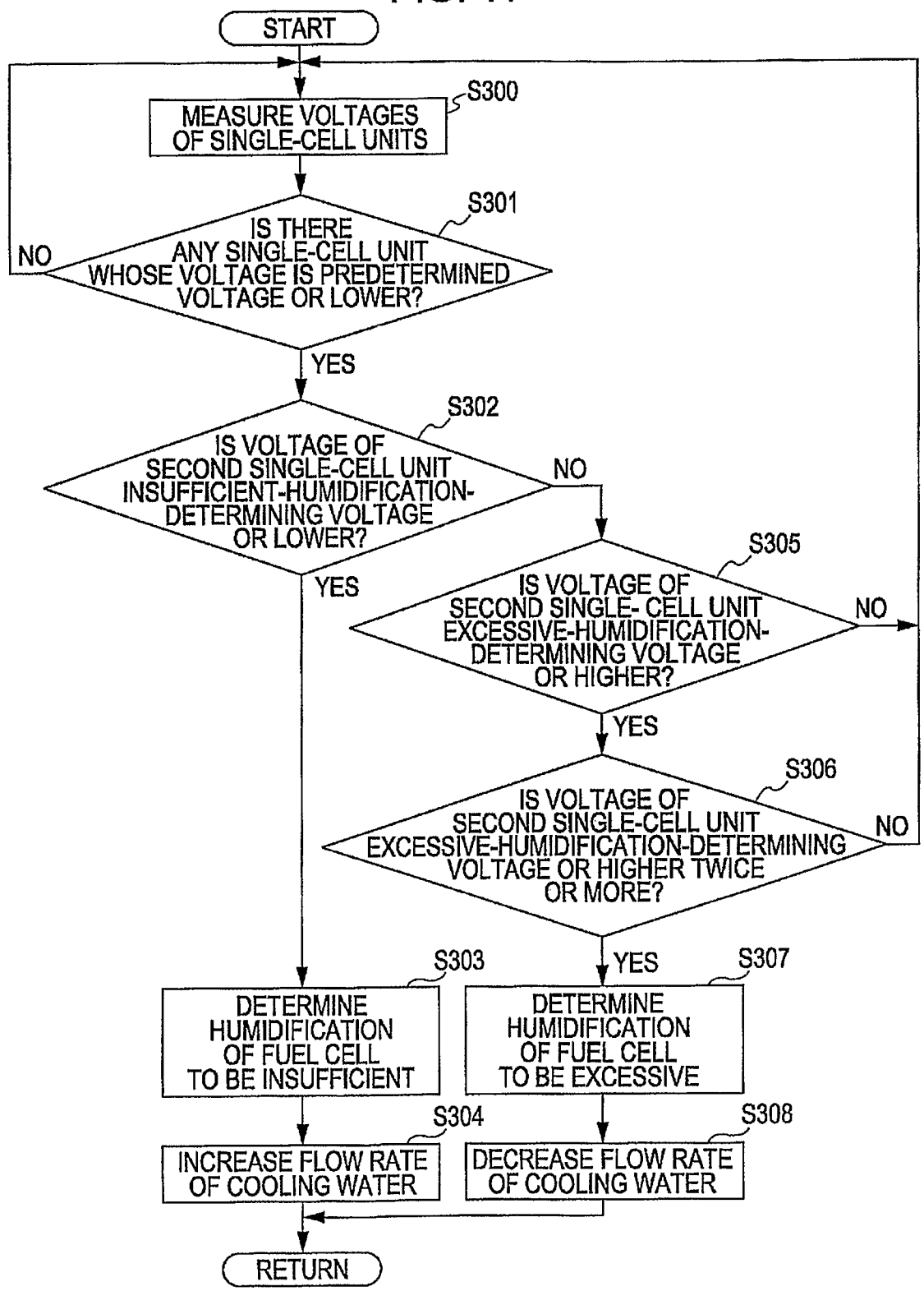
FIG. 11 is a flowchart showing the operation of a humidification-state-determining device of a fuel cell according to a third embodiment of the invention.

The operation of the humidification-state-determining device of the fuel cell according to the third embodiment will now be described with reference to the flowchart shown in FIG. 11. Steps S300 to S305 are the same as steps S100 to S105 shown in FIG. 4. In step S306, it is determined whether or not the voltage of the second single-cell unit exceeds the excessive-humidification-determining voltage twice or more. When the voltage of the second single-cell unit exceeds the excessive-humidification-determining voltage twice or more ("YES" in step S306), the program proceeds to step S307, and the humidification-state-determining unit 21 determines that humidification of the fuel cell 1 is excessive. In step S308, the flow rate of the cooling water is decreased. On the other hand, when the voltage of the second single-cell unit does not exceed the excessive-humidification-determining voltage twice or more ("NO" in step S306), the program returns to step S300 and the operation is continued.

When humidification of a single-cell unit 30 is excessive, a position of water clogging is changed. Therefore, water clogging in a gas flow path and elimination of the water clogging may occur at a position where the voltage is measured, resulting in a decrease in the voltage and a recovery of the voltage. Accordingly, the voltage of the second single-cell unit may increase or return to a normal voltage value. In the third embodiment, by measuring the change in the voltage a plurality of times, the state of excessive humidification can be determined with higher accuracy.

The operation of the determination of the insufficient humidification in the second embodiment may be combined with the third embodiment. In such a case, not only the state of excessive humidification but also the state of insufficient humidification can be determined with higher accuracy.

Fourth Embodiment

In the first embodiment, after the determination of insufficient humidification (step S102 in FIG. 4), the operation for eliminating the insufficient humidification is performed.

However, in a fourth embodiment, it is further determined whether or not the insufficient humidification is due to clogging of the cooling-water flow path 38.

Figure 12:
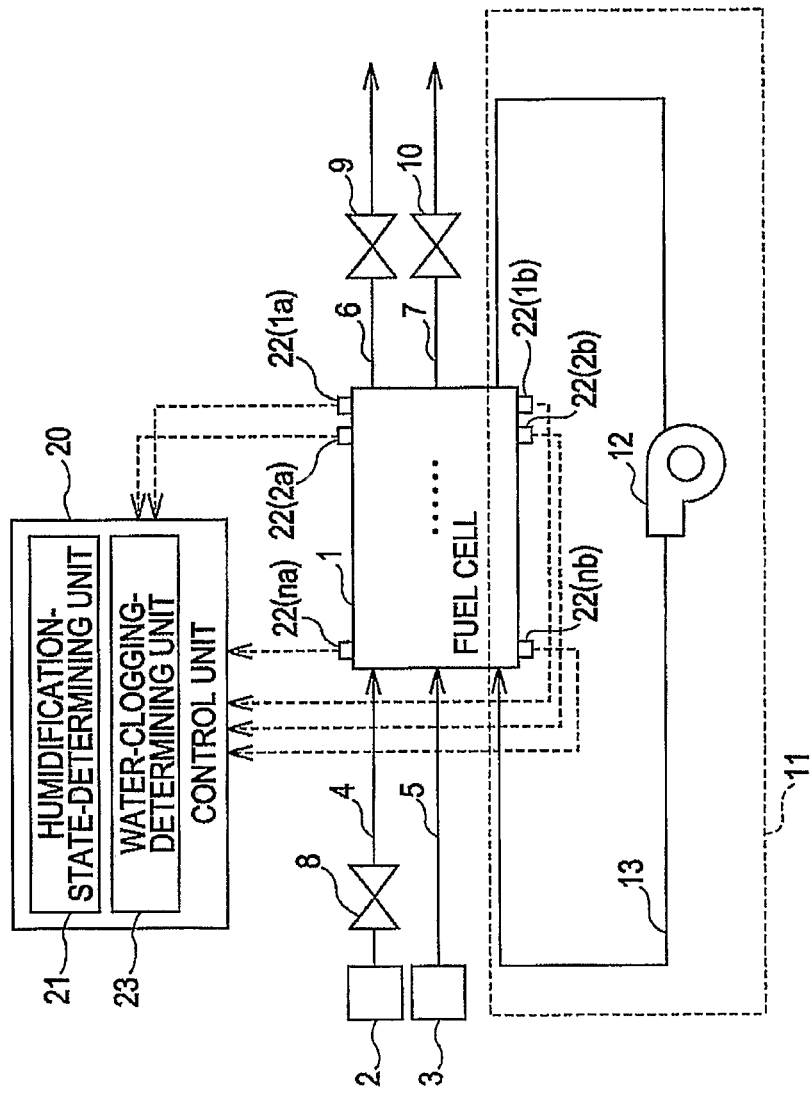
FIG. 12 is a schematic block diagram showing a fuel cell system including a humidification-state-determining device of a fuel cell according to a fourth embodiment of the invention.

FIG. 12 shows the overall structure of a fuel cell system including a humidification-state-determining device of a fuel cell according to the fourth embodiment. In the fourth embodiment, the control unit 20 further includes a water-clogging-determining unit 23. The water-clogging-determining unit 23 determines whether or not the insufficient humidification of the fuel cell is due to clogging of the cooling-water flow path 38.

Figure 13:
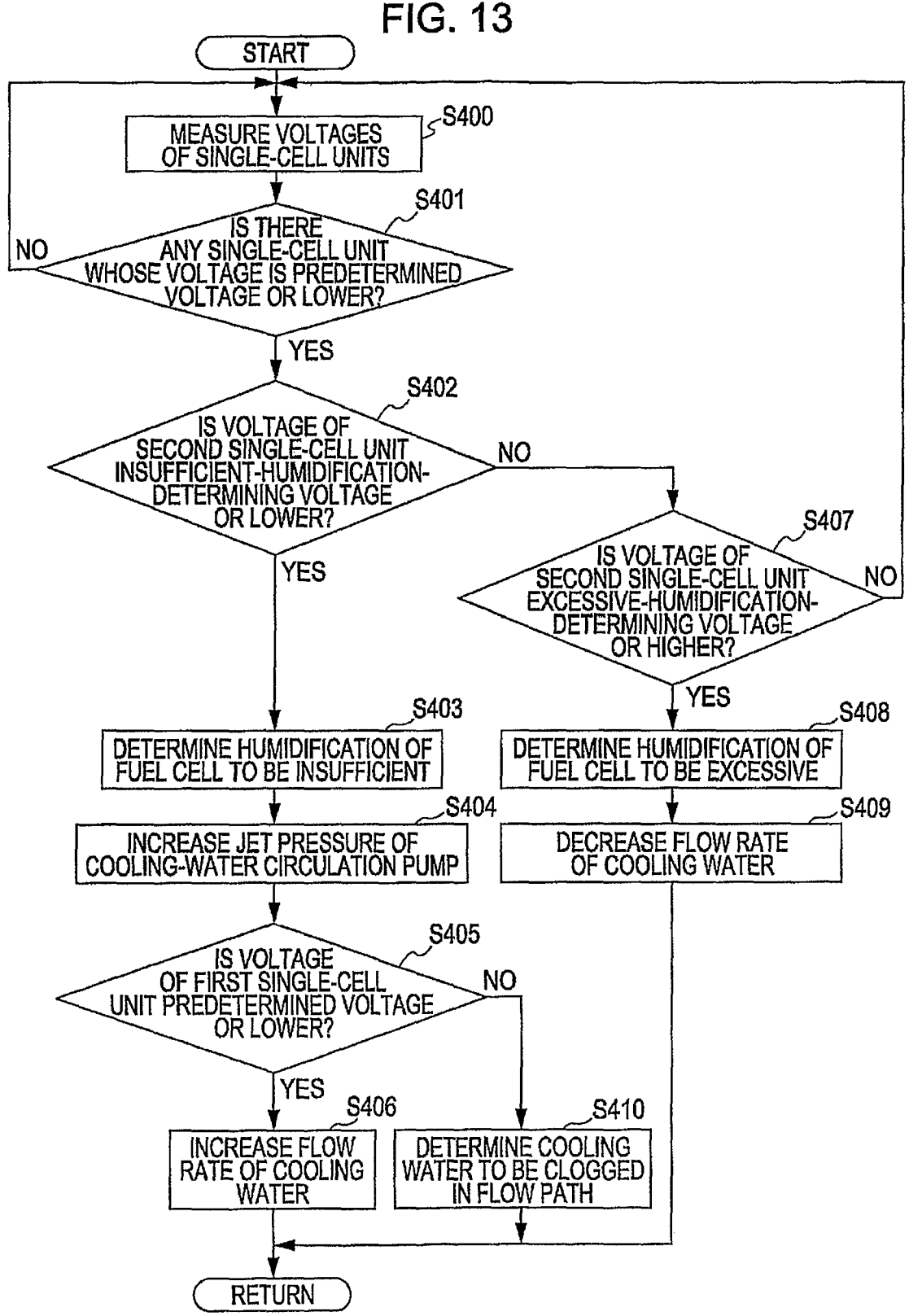
FIG. 13 is a flowchart showing the operation of the humidification-state-determining device of the fuel cell shown in FIG. 12.

The operation of the humidification-state-determining device of the fuel cell according to the fourth embodiment will now be described with reference to the flowchart shown in FIG. 13. Steps S400 to S403 are the same as steps S100 to S103 shown in FIG. 4. In step S404, the control unit 20 increases the jet pressure of the cooling-water circulation pump 12. Subsequently, in step S405, the voltage of the first single-cell unit is compared with the predetermined voltage. When the voltage is still equal to or lower than the predetermined voltage ("YES" in step S405), the program proceeds to step S406. The control unit 20 increases the flow rate of the cooling water. When the voltage is higher than the predetermined voltage ("NO" in step S405), the water-clogging-determining unit 23 determines that the insufficient humidification is due to clogging of the cooling-water flow path 38 (step S410). Steps S407 to S409 are the same as steps S105 to S107 shown in FIG. 4. Therefore, a description of these steps is not repeated.

In step S405, when the voltage of the first single-cell unit becomes higher than the predetermined voltage by increasing the jet pressure of the cooling-water circulation pump 12, it is determined that the insufficient humidification is due to clogging of the cooling-water flow path 38. The reason for this will now be described.

When the pressure of the cooling water is increased, air or the like clogged in the cooling-water flow path 38 is forced out. As a result, heat that has not been dissipated because the cooling water has not flowed can be dissipated in the cooling water, and the temperature of a single-cell unit 30 is decreased. Accordingly, the humidity in the fuel cell is increased, and the resistance R of the solid electrolyte membrane is decreased. Consequently, the voltage of the single-cell unit 30 is increased in accordance with equation (1).

In the fourth embodiment, when the voltage of the first single-cell unit, which has been decreased, is increased by increasing the pressure of the cooling water, it can be determined that the insufficient humidification is due to clogging of the cooling-water flow path 38.

Modification of Fourth Embodiment

Figure 14:
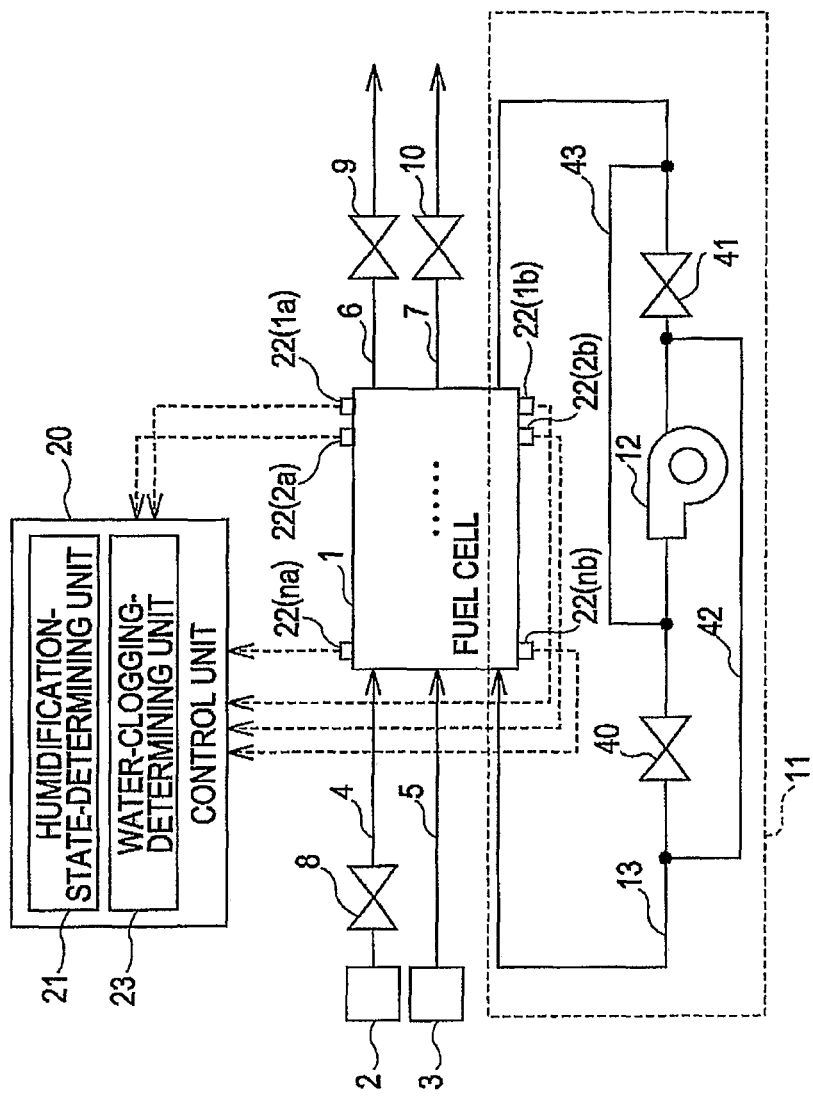
FIG. 14 is a schematic block diagram showing a fuel cell system including a humidification-state-determining device of a fuel cell according to a modification of the fourth embodiment.

FIG. 14 shows the overall structure of a fuel cell system including a humidification-state-determining device of a fuel cell according to a modification of the forth embodiment. As compared with the humidification-state-determining device of the fuel cell shown in FIG. 1, the humidification-state-determining device of this embodiment further includes a first valve 40, a second valve 41, a first bypass flow path 42, and a second bypass flow path 43 in the cooling-water circulation unit 11.

The first valve 40 is disposed in the cooling-water supply line 13 at a position between the circulation pump 12 and the fuel cell 1. The second valve 41 is disposed in the cooling-water supply line 13 at a position between the circulation pump 12 and the fuel cell 1.

The first bypass flow path 42 is branched from a position between the circulation pump 12 and the second valve 41 and connected to the cooling-water supply line 13 at a position between the first valve 40 and the fuel cell 1. The second bypass flow path 43 is branched from a position between the circulation pump 12 and the first valve 40 and connected to the cooling-water supply line 13 at a position between the second valve 41 and the fuel cell 1.

In the fourth embodiment, in step S404, the jet pressure of the cooling-water circulation pump 12 is increased. Alternatively, the circulation direction of the cooling water may be reversed by closing the first valve 40 and the second valve 41, thus removing, for example, foreign matter that has not been completely recovered with a foreign matter filter or the like and has clogged in the cooling-water flow path. Accordingly, heat that has not been dissipated because the cooling water has not flowed can be dissipated in the cooling water, and the temperature of the single-cell unit 30 is decreased. Thus, the same advantage as that in the fourth embodiment can be achieved.

Fifth Embodiment

In a fifth embodiment, voltage sensors 22 are disposed at least two positions (for example, at the end a and the end b in FIG. 2) on each of the single-cell units 30. In this embodiment, the humidification-state-determining unit determines the humidification state of the fuel cell 1 from the distribution of the voltage of a single-cell unit 30 measured at each of the positions. This determination method will now be described.

The overall structure of the fuel cell system including a humidification-state-determining device of a fuel cell of the fifth embodiment is the same as the structure shown in FIG. 1. As shown in FIG. 2, the single-cell units $30(1)$ to $30(n)$ forming the fuel cell 1 respectively include voltage sensors $22(1a)$ to $22(na)$ for detecting the voltages $V(1a)$ to $V(na)$ at the end "a" of each of the single-cell units 30, and voltage sensors $22(1b)$ to $22(nb)$ for detecting the voltages $V(1b)$ to $V(nb)$ at the end "b" of each of the single-cell units 30. Since the fuel gas and the oxidizer gas are supplied in opposite flow directions, the end "a" and the end "b" are a portion of the inlet side and a portion of the outlet side of the oxidizer gas of the single-cell units, and in addition, the end "a" and the end "b" are also a portion of the outlet side and a portion of the inlet side of the fuel gas, respectively. In terms of the structure of the single-cell units, the end "a" and the end "b" correspond to both end portions in the longitudinal direction of each of the single-cell units.

Figure 15:
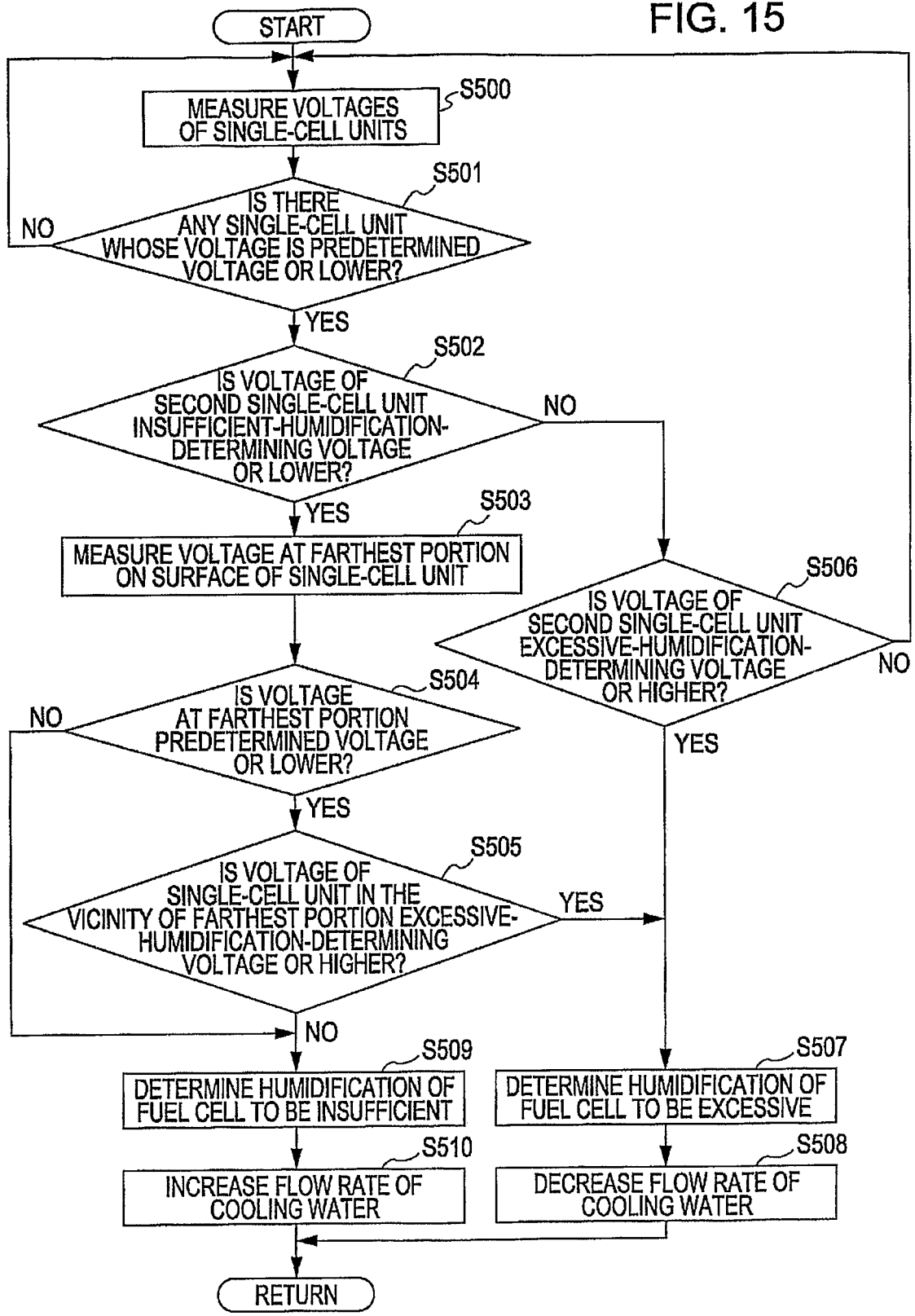
FIG. 15 is a flowchart showing the operation of a humidification-state-determining device of a fuel cell according to a fifth embodiment of the invention.

The operation of the humidification-state-determining device of the fuel cell according to the fifth embodiment will now be described with reference to the flowchart shown in FIG. 15.

First, in step S500, the voltages $V(1a)$ to $V(na)$ and $V(1b)$ to $V(nb)$ of the single-cell units $30(1)$ to $30(n)$ are measured. In step S501, it is detected whether or not, among the voltages $V(1a)$ to $V(na)$ and $V(1b)$ to $V(nb)$ of the single-cell units 30 measured in step S500, there is any single-cell unit 30 whose voltage is a predetermined voltage or lower. When, among the single-cell units 30, a first single-cell unit whose voltage is the predetermined voltage or lower is present ("YES" in step S501), the program proceeds to step S502. When, among the single-cell units 30, a single-cell unit 30 whose voltage is the predetermined voltage or lower is not present ("NO" in step S501), the program returns to step S500, and the operation is continued.

In step S502, the voltage of a second single-cell unit, disposed in the vicinity of the single-cell unit whose voltage is the predetermined voltage or lower, is compared with an insufficient-humidification-determining voltage. When the voltage of the second single-cell unit is equal to or lower than the insufficient-humidification-determining voltage ("YES" in step S502), the program proceeds to step S503. When the voltage of the second single-cell unit is higher than the insufficient-humidification-determining voltage ("NO" in step S502), the program proceeds to step S506.

In step S503, the voltage at the farthest portion on the surface of the single-cell unit whose voltage is the predetermined voltage or lower is measured. More specifically, when a voltage sensor 22(*a*) that has measured a voltage equal to or lower than the predetermined voltage is disposed at the end "a", the voltage at the farthest portion on the surface of this single-cell unit is measured using a voltage sensor 22(*b*) disposed at the end "b," which is located at the farthest portion on the surface.

The program proceeds to step S504, and whether or not the voltage at the farthest portion on the surface is the predetermined voltage or lower is determined. When the voltage is equal to or lower than the predetermined voltage ("YES" in step S504), the program proceeds to step S505. When the voltage is higher than the predetermined voltage ("NO" in step S504), the program proceeds to step S509.

In step S505, the voltage at the farthest portion on the surface of the second single-cell unit, disposed in the vicinity of the single-cell unit whose voltage is the predetermined voltage or lower, is compared with an excessive-humidification-determining voltage. When the voltage at the farthest portion on the surface of the second single-cell unit is equal to or higher than the excessive-humidification-determining voltage ("YES" in step S505), the program proceeds to step S507. When the voltage at the farthest portion on the surface of the second single-cell unit is lower than the excessive-humidification-determining voltage ("NO" in step S505), the program proceeds to step S509.

In step S509, the humidification-state-determining unit 21 determines that humidification of the fuel cell 1 is insufficient. The program proceeds to step S510, and the control unit 20 increases the flow rate of the cooling water.

On the other hand, in step S502, when the voltage of the second single-cell unit is higher than the insufficient-humidification-determining voltage ("NO" in step S502), the program proceeds to step S506 and the voltage of the second single-cell unit is compared with the excessive-humidification-determining voltage. When the voltage of the second single-cell unit is equal to or higher than the excessive-humidification-determining voltage ("YES" in step S506), the humidification-state-determining unit 21 determines that humidification of the fuel cell 1 is excessive (S507). The program proceeds to step S508, and the control unit 20 decreases the flow rate of the cooling water. On the other hand, when the voltage of the second single-cell unit is lower than the excessive-humidification-determining voltage ("NO" in step S506), the program returns to step S500 and the operation is continued.

As described above, when, in one portion (the end "a" or the end "b") of a single-cell unit 30, the voltage of a second single-cell unit, disposed in the vicinity of the single-cell unit whose voltage is the predetermined voltage or lower, is equal to or lower than the insufficient-humidification-determining voltage ("YES" in step S502), and when, in another portion (the end "b" or the end "a") of the single-cell unit, the voltage of the second single-cell unit is equal to or higher than the excessive-humidification-determining voltage ("YES" in step S505), the humidification-state-determining unit 21 determines that humidification of the fuel cell 1 is excessive. That is, even in the case where one portion of a single-cell unit 30 shows the state of insufficient humidification (FIG. 7), when another portion thereof shows the state of excessive humidification (FIG. 8), it is determined that humidification of the fuel cell 1 is excessive. Accordingly, erroneous determination can be prevented, and thus, a hole opening in an electrolyte membrane and vehicle failure can be prevented.

When, in one portion (the end "a" or the end "b") of a single-cell unit 30, the voltage of a second single-cell unit, disposed in the vicinity of the single-cell unit whose voltage is the predetermined voltage or lower, is equal to or lower than the insufficient-humidification-determining voltage ("YES" in step S502), and when, in another portion (the end "b" or the end "a") of the single-cell unit, the voltage of the second single-cell unit is lower than the excessive-humidification-determining voltage ("NO" in step S505), the humidification-state-determining unit 21 determines that humidification of the fuel cell 1 is insufficient. That is, in the case where one portion of a single-cell unit 30 shows the state of insufficient humidification, when another portion thereof does not show the state of excessive humidification, it is determined that humidification of the fuel cell 1 is insufficient. Accordingly, erroneous determination can be prevented, and thus, a hole opening in an electrolyte membrane and vehicle failure can be prevented.

By providing voltage sensors at the inlet position and the outlet position of the oxidizer gas, flooding due to the oxidizer gas can be detected. By providing voltage sensors at the inlet position and the outlet position of the fuel gas, flooding due to the fuel gas can be detected.

A method of determination in the case of excessive humidification in the fifth embodiment will now be described in more detail. First, a description will be made of the voltage distribution in the stacking direction in the vicinity of a voltage-measuring portion in the case of excessive humidification. As shown in FIG. 5, when a certain cell (i.e. a single-cell unit) is in an excessive humidification state, an excessive humidification portion 60 of the single-cell unit does not generate power. More accurately, a gas is not supplied or is not easily supplied to the power generation surface because of excessive humidification. As a result, power generation is inhibited, thereby decreasing the voltage. Accordingly, the load current inside the stack flows to bypass a non-power generation portion, or the power-generation performance-decreasing portion 60. However, the load current cannot flow while bypassing only the non-power generation portion. The reason for this is that, since current flowing in the surface direction (i.e. the minus X direction in FIG. 5) flows via separators, the current flows in an amount of only approximately a few amperes in the surface direction. Accordingly, the current starts to decrease at a cell separated from the power-generation performance-decreasing portion 60 by several cells. Although a single-cell unit adjacent to the power-generation performance-decreasing portion 60 can generate power, the amount of load current is decreased, and therefore, the voltage is increased in accordance with the I-V characteristics shown in FIG. 6. Accordingly, as regards the distribution of the voltage measured with voltage sensors provided at the side of the excessive humidification portion 60, as shown in FIG. 8, when the voltage of the excessive humidification portion 60 is decreased, the voltages of adjacent single-cell units are increased.

In this case, however, since such an excessive humidification portion is not included on the opposite side on the surface of the single-cell unit, i.e., at the farthest portion on the surface of the single-cell unit, the current becomes concentrated on the opposite side. Accordingly, the current is increased at the side opposite the excessive humidification portion 60, and the voltage is decreased. The voltage distribution at the side opposite the excessive humidification portion 60 shows a state similar to the case of insufficient humidification, as shown in FIG. 7.

As described above, in the case of excessive humidification, at a portion (in particular, the farthest portion on a surface) other than the excessive humidification portion (i.e. flooding-generating portion) 60 in a single-cell unit 30, the current density is increased and the voltage is decreased. As a result, a voltage distribution shows a state similar to the case of insufficient humidification, as shown in FIG. 7. Therefore, when the humidification state is determined on the basis of only the voltage distribution at a portion other than the excessive humidification portion 60, it may be erroneously determined to be insufficient humidification (i.e. dry-out), although flooding actually occurs.

In particular, when the stack, and consequently a single-cell unit, has a small dimension in the longitudinal direction that is easily affected by current distribution or when intense flooding occurs, the possibility of erroneous determination is increased. The cases where erroneous determination may occur will be described below.

(1) When a voltage-measuring portion is provided at only a single position on the surface of a single-cell unit 30 and a state similar to the case of insufficient humidification is observed, actually, the humidification may be excessive at the side opposite the voltage-measuring portion.

(2) When voltage-measuring portions are provided at a plurality of positions on the surface of a single-cell unit 30 and each of the voltage-measuring portions is independently determined, conflicting determinations may be obtained at different positions because a function of determining through comparison of a plurality of positions is not provided. Consequently, erroneous determination occurs or it may be possible that the determination cannot be performed.

(3) When the stack has a small dimension in the longitudinal direction, i.e., when the stack has a small dimension in the Y direction in FIG. 2, the effect of the current distribution easily reaches the surface opposite the flooding portion. Therefore, the voltage distribution at a portion opposite the flooding portion tends to show the state of insufficient humidification.

(4) In the case of significantly intense flooding, as in the case of (3), the area of a portion of power-generation defects is increased. Accordingly, when a current distribution is generated, the area where the current can flow is decreased. Consequently, the state similar to that of a stack having a small dimension in the longitudinal direction is observed.

A method of determination in the case of insufficient humidification (i.e. dry-out) will now be described.

In the case of dry-out, the solid electrolyte membrane becomes dry, and the resistance of the solid electrolyte membrane is increased. A singe-cell that is in a state of insufficient humidification causes a decrease in the voltage corresponding to an IR loss, and heat corresponding to the IR loss is dissipated. Therefore, the temperature near a single-cell unit 30 whose voltage is decreased by insufficient humidification is increased, and other adjacent single-cell units 30 also become dry. Accordingly, these adjacent single-cell units 30 are also in a state of insufficient humidification, resulting in a decrease in the voltage. Accordingly; the voltage at not only the insufficient humidification portion but also the adjacent portions is decreased. Therefore, unlike the case of excessive humidification, the behavior in which the voltages of adjacent single-cell units 30 are increased is not observed. In the case of insufficient humidification, regarding the voltage distribution in the stacking direction of other voltage-measuring portions on the surface, the voltage distribution becomes flat or the voltage tends to decrease because of the drying due to heat generation. This is because, unlike the case of excessive humidification, the voltage distribution is not affected by current distribution. As described above, in the case of dry-out, the phenomenon wherein, when the voltage is decreased, the voltage distribution is affected by the current distribution and the voltages at other portions are increased does not occur.

When a single-cell unit 30 whose voltage is decreased is detected, the voltage behavior of another single-cell unit 30 adjacent to the portion where the voltage is decreased is examined. In this case, as shown in FIG. 8, when an increase in the voltage is confirmed ("YES" in step S506), it is determined that flooding occurs (step S507) without examining (i.e. comparing with) the voltage behavior at a plurality of other voltage-measuring portions provided on the surface. On the other hand, in the case where a single-cell unit 30 whose voltage is decreased is detected, when the voltage behavior of another single-cell unit 30 adjacent to the portion where the voltage is decreased is examined and the voltage is decreased as shown in FIG. 7 ("YES" in step S502), whether dry-out occurs or flooding occurs is determined on the basis of the voltage behavior at a plurality of other voltage-measuring portions provided on the surface. More specifically, when the voltage behavior at the other voltage-measuring portions shows excessive humidification, it is determined that flooding occurs. When the voltage behavior at the other voltage-measuring portions does not show excessive humidification, it is determined that dry-out occurs.

As described above, according to the fifth embodiment, voltage-measuring portions are provided at least two positions on the same single-cell unit 30. The determination of drying or wetting is performed in consideration of the voltage distribution during power generation not only in the stacking direction but also in the surface direction. Accordingly, the accuracy of the determination is improved, thereby preventing a hole opening in an electrolyte membrane and a decrease in the output due to insufficient humidification.

The voltage-measuring portions may be provided at three positions or more (for example, at both end portions in the longitudinal direction of each single-cell unit and the central portion thereof). In such a case, when the behavior during flooding is observed at at least one of the three positions, it is determined that flooding occurs. When the behavior during dry-out is observed at all three positions, it is determined that dry-out occurs.

The control unit 20 may further include a water-clogging-determining unit 23 that determines water clogging in a cooling-water flow path. When the humidification-state-determining unit 21 determines that humidification of the fuel cell 1 is insufficient, at least one of a process of increasing the pressure of the cooling water and a process of reversing the flow direction of the cooling water is executed. After the process is performed, when the voltage of a single-cell unit whose voltage is a predetermined voltage or lower is increased, the water-clogging-determining unit 23 determines that water is clogged in the cooling-water flow path.

When the humidification-state-determining unit 21 determines that humidification of the fuel cell 1 is insufficient, the control unit 20 may execute at least any one of a process of increasing the flow rate of the cooling water that cools the single-cell units 30, a process of decreasing the flow rate of at least one of the fuel gas and the oxidizer gas, a process of increasing the pressure of at least one of the fuel gas and the oxidizer gas, and a process of increasing the humidity of at least one of the fuel gas and the oxidizer gas.

When the humidification-state-determining unit 21 determines that humidification of the fuel cell 1 is excessive, the control unit 20 may execute at least any one of a process of decreasing the flow rate of the cooling water that cools the single-cell units 30, a process of increasing the flow rate of at least one of the fuel gas and the oxidizer gas, a process of decreasing the pressure of at least one of the fuel gas and the oxidizer gas, and a process of decreasing the humidity of at least one of the fuel gas and the oxidizer gas.

In the first to fifth embodiments and modifications thereof, when the voltage-measuring portion in a single-cell unit whose voltage is equal to or lower than a predetermined voltage is a portion disposed at the outlet side of the oxidizer gas, the humidification-state-determining unit 21 may determine that humidification of the fuel cell is excessive at the cathode side. According to this structure, flooding due to the oxidizer gas can be detected.

When the voltage-measuring portion in a single-cell unit whose voltage is equal to or lower than a predetermined voltage is a portion disposed at the outlet side of the fuel gas, the humidification-state-determining unit 21 may determine that humidification of the fuel cell is excessive at the anode side. According to this structure, flooding due to the fuel gas can be detected.

Furthermore, the humidification-state-determining unit 21 may set a second excessive-humidification-determining voltage that is higher than the above-described excessive-humidification-determining voltage. When the voltage of a single-cell unit disposed in the vicinity of a single-cell unit whose voltage is a predetermined voltage or lower is higher than the second excessive-humidification-determining voltage, the humidification-state-determining unit 21 may determine that the humidification of the fuel cell is excessive and that the degree of the excessive humidification is high. According to this structure, the degree of excess during excessive humidification can be determined. In this case, the control unit 20 may execute at least any one of a process of decreasing the flow rate of the cooling water that cools the single-cell units 30, a process of increasing the flow rate of at least one of the fuel gas and the oxidizer gas, a process of decreasing the pressure of at least one of the fuel gas and the oxidizer gas, and a process of decreasing the humidity of at least one of the fuel gas and the oxidizer gas wherein the increases and decreases achieved in the processes are larger than in the normal case.

After it is determined whether or not the voltage of the second single-cell unit is at least the excessive-humidification-determining voltage, it can be determined whether or not the voltage of the second single-cell unit is up to the insufficient-humidification-determining voltage. Accordingly, in the case of excessive humidification, a change in the voltage is faster than that in the case of insufficient humidification. Therefore, the humidification state can be determined more instantaneously.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell system comprising:
   a plurality of single-cell units, each of which include an electrolyte membrane disposed between an anode and a cathode and which generate electric power by a reaction of a fuel gas in the anode and an oxidizer gas in the cathode;
   a fuel cell in which the plurality of single-cell units are stacked;
   a plurality of voltage measurement devices that measure the voltages of the single-cell units, respectively; and
   a control unit programmed to determine the humidification state of the fuel cell based on the voltage of a second single-cell unit disposed in the vicinity of a first single-cell unit, the first single-cell unit having a voltage that is equal to or lower than a predetermined voltage,
   wherein when the voltage of the second single-cell unit is equal to or lower than a predetermined insufficient-humidification-determining voltage which is higher than the predetermined voltage and is stored in the control unit, the control unit is programmed to determine that humidification of the fuel cell is insufficient.

2. The fuel cell system according to claim 1, wherein when the voltage of the second single-cell unit is equal to or higher than a predetermined excessive-humidification-determining voltage which is equal to or higher than the insufficient-humidification-determining voltage and is stored in the control unit, the control unit is programmed to determine that humidification of the fuel cell is excessive.

3. The fuel cell system according to claim 2, further comprising:
   an average-voltage arithmetic unit that calculates an average voltage of the plurality of single-cell units,
   wherein the insufficient-humidification-determining voltage is equal to or lower than the average voltage, and the excessive-humidification-determining voltage is equal to or higher than the average voltage.

4. The fuel cell system according to claim 2, wherein the insufficient-humidification-determining voltage is equal to the excessive-humidification-determining voltage.

5. The fuel cell system according to claim 2, wherein when the voltage of the second single-cell unit exceeds the excessive-humidification-determining voltage multiple times, the control unit is programmed to determine that humidification of the fuel cell is excessive.

6. The fuel cell system according to claim 1, wherein when the voltage of the second single-cell unit decreases with time, the control unit is programmed to determine that humidification of the fuel cell is insufficient.

7. The fuel cell system according to claim 1, wherein
   the voltage measurement devices are provided at at least two positions on each single-cell unit, and
   the control unit is programmed to determine the humidification state of the fuel cell based on a distribution of the voltage measured at each position on the single-cell unit.

8. The fuel cell system according to claim 7, wherein when, in one portion of the first single-cell unit, the voltage of the second single-cell unit is equal to or lower than the predetermined insufficient-humidification-determining voltage which is higher than the predetermined voltage and is stored in the control unit, and when, in another portion of the first single-cell unit, the voltage of the second single-cell unit is higher than a predetermined excessive-humidification-determining voltage which is equal to or higher than the insufficient-humidification-determining voltage and is stored in the control unit, the control unit is programmed to determine that humidification of the fuel cell is excessive.

9. The fuel cell system according to claim 7, wherein when, in one portion of the first single-cell unit, the voltage of the second single-cell unit is equal to or lower than the predetermined insufficient-humidification-determining voltage which is higher than the predetermined voltage and is stored in the control unit, and when, in another portion of the first single-cell unit, the voltage of the second single-cell unit is equal to or lower than a predetermined excessive-humidification-determining voltage which is equal to or higher than the insufficient-humidification-determining voltage and is stored in the control unit, the control unit is programmed to determine that humidification of the fuel cell is insufficient.

10. The fuel cell system according to claim 8, wherein
the voltage measurement devices are provided at a supply portion of the fuel gas of each single-cell unit, a supply portion of the oxidizer gas of each single-cell unit, and a central portion of each single-cell unit;
in each single-cell unit, the flow direction of the fuel gas in the anode is opposite to the flow direction of the oxidizer gas in the cathode; and
when at least one of the voltage measurement devices determines that humidification is excessive, the control unit is programmed to determine that humidification of the fuel cell is excessive, and when all the voltage measurement devices determine that humidification is insufficient, the control unit is programmed to determine that humidification of the fuel cell is insufficient.

11. The fuel cell system according to claim 1, wherein
a voltage measurement device is provided at an outlet side of the oxidizer gas;
in each single-cell unit, the flow direction of the fuel gas in the anode is opposite to the flow direction of the oxidizer gas in the cathode; and
when a voltage equal to or lower than the predetermined voltage is measured, the control unit is programmed to determine that humidification of the fuel cell is excessive at the cathode.

12. The fuel cell system according to claim 1, wherein
a voltage measurement device is provided at an outlet side of the fuel gas;
in each single-cell unit, the flow direction of the fuel gas in the anode is opposite to the flow direction of the oxidizer gas in the cathode; and
when a voltage equal to or lower than the predetermined voltage is measured, the control unit is programmed to determine that humidification of the fuel cell is excessive at the anode.

13. The fuel cell system according to claim 1, further comprising:
a wet-state-adjusting device that adjusts the wet state of the electrolyte membrane,
wherein when the control unit determines that humidification of the fuel cell is insufficient, the control unit executes a control for increasing the humidity of the electrolyte membrane.

14. The fuel cell system according to claim 2, further comprising:
a wet-state-adjusting device that adjusts the wet state of the electrolyte membrane,
wherein when the control unit determines that humidification of the fuel cell is excessive, the control unit executes a control for decreasing the humidity of the electrolyte membrane.

15. The fuel cell system according to claim 1, further comprising:
a cooling-water flow path that cools the plurality of single-cell units; and
a water-clogging-determining unit programmed to determine water clogging of the cooling-water flow path;
wherein when the control unit determines that humidification of the fuel cell is insufficient, the control unit executes at least one of a process of increasing the pressure of cooling water and a process of reversing the flow direction of the cooling water, and after the process, when the voltage of the single-cell unit whose voltage is equal to or lower than the predetermined voltage is increased, the water-clogging-determining unit is programmed to determine that the cooling water is clogged in the cooling-water flow path.

16. The fuel cell system according to claim 1, wherein the second single-cell unit is in contact with the first single-cell unit, and the voltage of the second single-cell unit is higher than the predetermined voltage.

17. A fuel cell system comprising:
a plurality of single-cell units, each of which include an electrolyte membrane disposed between an anode and a cathode and which generate electric power by a reaction of a fuel gas in the anode and an oxidizer gas in the cathode;
a fuel cell in which the plurality of single-cell units are stacked;
a plurality of voltage measurement devices that measure the voltages of the single-cell units, respectively; and
a control unit programmed to determine that humidification of the fuel cell is excessive when the control unit detects a first single-cell unit having a voltage that is equal to or lower than a predetermined voltage, and a second single-cell unit having a voltage that is equal to or higher than a predetermined excessive-humidification-determining voltage that is higher than the predetermined voltage and is stored in the control unit.

18. The fuel cell system according to claim 5, wherein when the voltage of the second single-cell unit decreases with time, the control unit is programmed to determine that humidification of the fuel cell is insufficient.

19. The fuel cell system according to claim 9, wherein the voltage measurement devices are provided at a supply portion of the fuel gas of each single-cell unit, a supply portion of the oxidizer gas of each single-cell unit, and a central portion of each single-cell unit;
in each single-cell unit, the flow direction of the fuel gas in the anode is opposite to the flow direction of the oxidizer gas in the cathode; and
when at least one of the voltage measurement devices determines that humidification is excessive, the control unit is programmed to determine that humidification of the fuel cell is excessive, and when all the voltage measurement devices determine that humidification is insufficient, the control unit is programmed to determine that humidification of the fuel cell is insufficient.

20. The fuel cell system according to claim 7, further comprising:
a cooling-water flow path that cools the plurality of single-cell units; and
a water-clogging-determining unit programmed to determine water clogging of the cooling water flow path;
wherein when the control unit determines that humidification of the fuel cell is insufficient, the control unit executes at least one of a process of increasing the pressure of cooling water and a process of reversing the flow direction of the cooling water, and after the process, when the voltage of the single-cell unit whose voltage is equal to or lower than the predetermined voltage is increased, the water-clogging-determining unit is programmed to determine that the cooling water is clogged in the cooling-water flow path.

* * * * *